Oct. 30, 1962  C. D. BEINTEMA  3,061,755
ENCAPSULATED ELECTROLUMINESCENT DEVICE
Filed Nov. 27, 1959

INVENTOR.
CHESTER D. BEINTEMA,
BY John M. Koch
ATTORNEY

United States Patent Office 3,061,755
Patented Oct. 30, 1962

3,061,755
ENCAPSULATED ELECTROLUMINESCENT DEVICE
Chester D. Beintema, Malibu, Calif., assignor to Hughes Aircraft Company, Culver City, Calif., a corporation of Delaware
Filed Nov. 27, 1959, Ser. No. 855,649
1 Claim. (Cl. 313—108)

This invention relates to an electroluminescent device, and particularly to an electroluminescent panel characterized by structural and construction improvements resulting in a panel of increased light output and service life.

One of the difficulties encountered in producing an electroluminescent device of high efficiency and long service life is that of protecting the electroluminescent phosphor from moisture or water vapor. The entry of moisture or water vapor into the phosphor results in a shortening of the active life thereof and causes a reduction in its light output efficiency. Moisture has a deleterious effect on the chemical composition of the electroluminescent phosphor, probably by leaching out the activators thereby removing the active centers from the crystal lattice of the phosphor. This results in reduced light output and shorter useful lifetime. Inclusion and/or absorption of moisture with subsequent leaching of salts from the panel materials creates low resistance paths for current between the conductive layers and through the phosphor and dielectric layers. This causes local heating and breakdown of the dielectric layers which, in turn, results in a short between the conductive layers. Inadequate insulation of the electrodes also results in voltage leaks and reduced light output. It is very desirable, therefore, to electrically insulate the phosphor against short circuits and to seal and protect the same from the admission thereto of moisture or water vapor.

Accordingly, it is an important object of this invention to provide an electroluminescent device characterized by having a long service life and a high degree of efficiency for the production of electroluminescence.

Additional objects will become apparent from the following description which is given primarily for purposes of illustration and not limitation.

Briefly stated in general terms, the objects of this invention are attained by providing an electroluminescent device comprising an electroluminescent phosphor disposed between two electrical conductors. One of these conductors, usually the front one, is made of light-transmitting material and preferably is transparent. The phosphor preferably is highly insulated from the other, or rear, conductor, which generally is opaque and formed of a metal or other suitable highly conducting material. The highly insulating material employed preferably is a high dielectric strength plastic material, and especially a polyester, such as polyethylene terephthalate. The resulting structure is sealed against moisture and water vapor by encapsulating the same in a plastic material, preferably by casting an epoxy resin around the structure, or at least over the back and edges thereof.

A more detailed description of specific embodiments of my invention is given with reference to the attached drawing, wherein.

Figure 1:
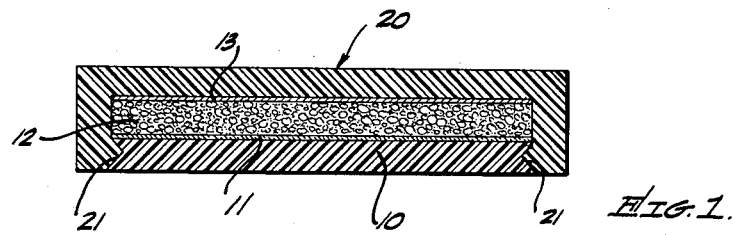
FIG. 1 is a cross-sectional view of an electroluminescent panel showing the structural relationships of the various components of the panel.

The transparent or translucent member 10 forming the front side of the panel preferably is made of a transparent plastic sheet but can be made of glass, mica or similar light-transmitting material in the form of a pane, film or sheet. A transparent, semi-transparent or translucent conductor 11 of dimensions similar to those of member 10 is firmly attached to the rear or inner surface of member 10. Conductor 11 can be made of a thin film of tin, oxide, titanium dioxide, or the like, or a thin layer of a metal, such as gold. The conductor 11 can be applied to member 10 in any suitable manner and usually is applied by evaporating the conductor upon member 10 in a vacuum. A fine metal mesh screen bonded to transparent member 10 also can be used as conductor 11. Such a conductor transmits light through the openings in the screen.

The conductor 11 should adhere tightly and uniformly to the inner surface of member 10 to avoid the admission of moisture or water vapor into any spaces between member 10 and conductor 11. It has been found that this can be accomplished by finely sandblasting the inner surface of member 10 before evaporating light-transmitting conductor 11 onto the surface. In such case, a thin light-transmitting layer of dielectric material is sprayed on top of the evaporated gold layer to restore light-transmitting efficiency to the sandblasted member 10 and conductor 11.

Phosphor layer 12 is applied to the exposed, inner surface of transparent conductor 11. This can be accomplished by any of several suitable methods known in the art, such as by depositing a slurry coating, by applying a spray coating, by a silk screening operation or by vapor deposition of a suitable phosphor on the exposed, inner surface of conductor 11. Care should be taken in preparing the phosphor and in applying it to conductor 11 to avoid any occlusion, absorption or other contamination of the phosphor with moisture. Any such inclusion of moisture in the phosphor will, of course, result in an inferior device having low efficiency in the production of electroluminescence. The phosphor 12 usually is a mixture of chemicals such as activated zinc sulfide and zinc oxide, for example. A small amount of an activator, such as manganese, copper or silver usually is included in the phosphor mixture. A high dielectric constant material, such as barium titanate, can be included in the mixture of phosphor chemicals to increase the efficiency of electroluminescence production for a given set of conditions.

A second conductor layer 13 is applied to the exposed, inner surface of phosphor layer 12. Conductor 13 usually is not light-transmitting but, instead, is opaque. Conductor 13 can be applied by any suitable method, such as by spraying or vacuum evaporation of the conductor on to the surface of phosphor 12. For example, a silver spray or paste can be applied to form a silver conductor. Other suitable conductor materials for use in conductor 13 are aluminum, gold, copper or a fine metal mesh screen applied as a sheet. This mesh screen has the feature of transmitting light through the openings in the screen and can be used in applications where this is desirable.

Figure 2:
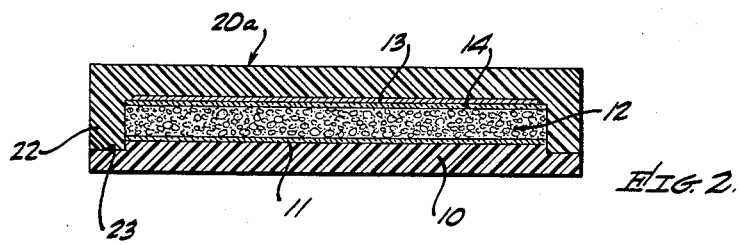
FIG. 2 is a similar view showing another embodiment of my invention.

Alternatively, instead of applying the second conductor 13 directly upon the exposed, inner surface of phosphor 12, a layer of insulating material 14 of high dielectric strength can be applied to form an insulation between phosphor 12 and conductor 13, as shown in FIG. 2. Polyethylene terephthalate in film form, sold on the market by E. I. du Pont de Nemours and Company of Wilmington, Delaware, under the trademark Mylar, has been found to be a very satisfactory insulator. Its use has resulted in the production of an increase in the intensity in electroluminescence as compared to a device in which it is absent. Mylar is exceptionally suitable for use in the manner described immediately above because it has outstanding strength properties, moisture insensitivity, high voltage breakdown, high resistivity and an acceptable dielectric constant for use in electroluminescent devices. In this alternative method conductor 13 is applied to the exposed, inner surface of the Mylar film 14.

The resulting structure produced in either of the two devices described above is sealed against the admission of moisture or water vapor to the phosphor by suitably encapsulating the assembled structure. In a preferred method, a suitable epoxy resin, chosen to be compatible with the physical properties of light-transmitting member 10, is cast around the back and edges of the assembled electroluminescent structure. Any suitable method of casting can be employed. For example, a rubber mold can be used.

Figure 3:
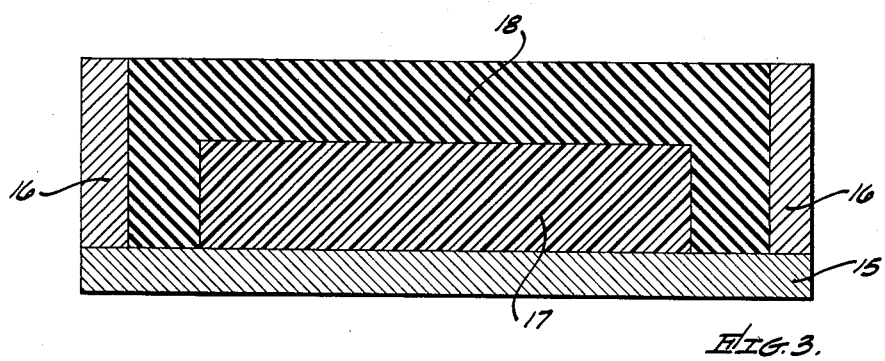
FIG. 3 is a vertical sectional view showing apparatus for casting a rubber mold.
Figure 4:
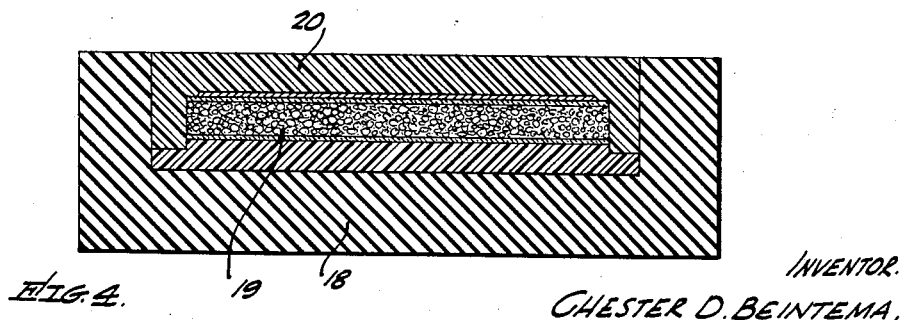
FIG. 4 is a vertical sectional view showing apparatus for encapsulating an electroluminescent panel.

Such a mold is formed as shown in FIG. 3. A flat, horizontal glass or metal plate 15 is provided with a confining ring or dam 16. A plastic pattern 17, having the overall length and width of the electroluminescent panel being produced, and having a suitable thickness, is positioned upon plate 15 inside ring 16. Fluid casting rubber is poured within the ring 16 to a suitable height covering pattern 17, as shown. After the casting rubber 18 has solidified, it is removed from ring 16. Pattern 17 is removed from the solidified rubber mold 18. The mold 18 is set upright, as shown in FIG. 4, to serve as a mold for encapsulating electroluminescent panels.

The encapsulation operation is carried out by pressing an electroluminescent panel 19 inside the rubber mold with light-transmitting member 10 adjacent the bottom of the mold and conductor 13 uppermost and exposed, as shown. The fluid epoxy resin, or resin mixture, is heated to a sufficient temperature to melt the same and impart thereto the desired degree of fluidity for molding purposes. The fluid resin is poured on top of panel 19 to the desired level, as shown. A suitable encapsulating structure 20 is formed around the exposed conductor 13 and around the edges of phosphor 12, light-transmitting conductor 11 and light-transmitting member 10. The resin is permitted to solidify and cool to form a vapor tight encapsulating structure. The resulting encapsulated panel is removed from rubber mold 18.

It has been found that a cast epoxy structure prevents moisture from reaching and attacking the electroluminescent phosphor layer if the edge of the encapsulating structure 20 is irregular or offset, as best shown in FIGS. 1 and 2. In FIG. 1, the edge is shown to have a reentrant portion 21, which projects into an angular edge groove formed around the edges of light-transmitting member 10. A less elaborate arrangement is shown in FIG. 2 werein the encapsulating structure 20a is provided with a flanged edge portion 22 formed to tightly join a grooved border portion 23 of light-transmitting member 10 in an interlocking arrangement or engaging relationship to tightly seal phosphor 12 against moisture or water vapor. Innumerable other edge seals of irregular cross-section can be made between the encapsulating structure 20 and the light-transmitting member 10.

When the Mylar film 14 is included in the electroluminescent packages, the light output thereof is significantly increased. Also, the possibility of panel breakdown by high voltages is greatly lessened. The danger of short circuit development is greatly decreased and higher voltages can be impressed across the phosphor to produce greater accompanying light output.

It will be understood that although an embodiment of my invention has been described above in connection with the use of an epoxy resin, other resins or plastics can be used for the encapsulation structure 20. The particular plastic chosen will depend upon the material chosen for the light-transmitting member 10. It has been found that the tensile strength and thermal expansion characteristics of both light-transmitting member 10 and the resin or plastic used in encapsulating structure 20 should be compatible to avoid warping, bending or cracking difficulties resulting from stresses produced by selecting incompatible materials. It has been found that when light-transmitting member 10 is made of polymethyl methacrylate, a strong seal is obtained by using an epoxy resin sold on the market by Shell Chemical Company of San Francisco, California under the trademark Epon 828 as the casting resin for the encapsulating structure. There should also, of course, be a strong adhesive bond between the encapsulating resin and member 10 to seal the phosphor 12 effectively.

It will be apparent that many variations in the materials, combinations of materials and methods of constructing the electroluminescent device of my invention will occur to a person skilled in the art. The materials and methods given hereinabove are presented primarily for descriptive and illustrative purposes and I intend my invention to be limited only by the scope of the appended claim.

What is claimed is:

An electroluminescent device comprising a light-transmitting member of polymethyl methacrylate, a light-transmitting conductor layer positioned adjacent the polymethyl methacrylate member, an electroluminescent phosphor layer positioned adjacent the light-transmitting conductor layer, a layer of polyethylene terephthalate film positioned adjacent the phosphor layer, a second conductor layer positioned adjacent the polyethylene terephthalate film, and an encapsulating structure of epoxy resin cast around the second conductor layer and edge portions of said respective layers for sealing moisture and water vapor from the device, said edge portions of said respective layers and said epoxy resin encapsulating structure being bonded to each other by edge seals, including a vapor-tight seal between the light-transmitting polymethyl methacrylate member and the epoxy resin encapsulating structure, wherein said member and said structure engage each other in interlocking relationship.

References Cited in the file of this patent
UNITED STATES PATENTS

| | | |
|---|---|---|
| 2,755,406 | Burns | July 17, 1956 |
| 2,830,156 | Burgess | Apr. 8, 1958 |
| 2,881,344 | Michlin | Apr. 7, 1959 |
| 2,883,582 | Hanlet | Apr. 21, 1959 |
| 2,895,031 | Kozacka | July 14, 1959 |
| 2,944,177 | Piper | July 5, 1960 |
| 2,988,661 | Goodman | June 13, 1961 |